(12) United States Patent
Camacho Perez et al.

(10) Patent No.: US 11,586,216 B2
(45) Date of Patent: Feb. 21, 2023

(54) DRIVING SURFACE PROTRUSION PATTERN DETECTION FOR AUTONOMOUS VEHICLES

(71) Applicant: Intel Corporation, Santa Clara, CA (US)

(72) Inventors: Jose Rodrigo Camacho Perez, Guadalajara (MX); Ignacio J. Alvarez, Portland, OR (US); Hector Cordourier Maruri, Guadalajara (MX); Paulo Lopez Meyer, Zapopan (MX); Francisco Rangel Patino, Zapopan (MX); Edgar Andrei Vega, Tlaquepaque (MX); Andres Viveros Wacher, Jalisco (MX); Julio Zamora Esquivel, Zapopan (MX)

(73) Assignee: Intel Corporation, Santa Clara, CA (US)

(*) Notice: Subject to any disclaimer, the term of this patent is extended or adjusted under 35 U.S.C. 154(b) by 200 days.

(21) Appl. No.: 16/832,802

(22) Filed: Mar. 27, 2020

(65) Prior Publication Data
US 2021/0034065 A1    Feb. 4, 2021

(51) Int. Cl.
*G05D 1/02* (2020.01)
*B60W 40/06* (2012.01)
*G01C 21/36* (2006.01)

(52) U.S. Cl.
CPC ........... *G05D 1/0227* (2013.01); *B60W 40/06* (2013.01); *G01C 21/3602* (2013.01); *G05D 1/0219* (2013.01); *G05D 1/0248* (2013.01)

(58) Field of Classification Search
CPC .. G05D 1/0227; G05D 1/0219; G05D 1/0248; B60W 40/06; B60W 2552/00;
(Continued)

(56) References Cited

U.S. PATENT DOCUMENTS

| | | | |
|---|---|---|---|
| 6,010,277 A * | 1/2000 | Follman | E01F 9/529 404/11 |
| 6,539,293 B2 * | 3/2003 | Bachtiger | B61K 9/08 701/20 |

(Continued)

FOREIGN PATENT DOCUMENTS

| | | | | |
|---|---|---|---|---|
| DE | 102021103130 A1 * | 12/2021 | | E01F 9/529 |
| FR | 2978563 A1 * | 2/2013 | | G08G 1/02 |
| WO | WO-2008051144 A1 * | 5/2008 | | B60W 30/12 |

OTHER PUBLICATIONS

H. Claussen, J. Aparicio, J. Rosca and N. C. Tas, "IPASS: Intelligent pavement signaling System," 2012 15th International IEEE Conference on Intelligent Transportation Systems, 2012, pp. 666-671, doi: 10.1109/ITSC.2012.6338699. (Year: 2012).*

(Continued)

*Primary Examiner* — Angelina Shudy
(74) *Attorney, Agent, or Firm* — Banner & Witcoff Ltd.

(57) ABSTRACT

A component of an Autonomous Vehicle (AV) system, the component having at least one processor; and a non-transitory computer-readable storage medium including instructions that, when executed by the at least one processor, cause the at least one processor to decode data encoded in a signal, wherein the data identifies a pattern of protrusions embedded in a driving surface, the signal being received from at least one vehicle sensor resulting from a vehicle driving over the pattern of protrusions in the driving surface.

20 Claims, 5 Drawing Sheets

(58) Field of Classification Search
CPC .......... B60W 2552/53; G01C 21/3602; E01F 11/00; E01F 9/529; G06K 9/6289; G06K 9/00543; G06V 10/803; G06V 10/98; G06V 20/56

See application file for complete search history.

(56) References Cited

U.S. PATENT DOCUMENTS

| | | | | |
|---|---|---|---|---|
| 7,011,470 | B1* | 3/2006 | Breazeale | E01F 9/529 404/11 |
| 7,316,594 | B2* | 1/2008 | Longdill | B60G 3/24 440/12.5 |
| 7,507,052 | B2* | 3/2009 | Griffiths | E01F 9/529 404/11 |
| 8,636,440 | B1* | 1/2014 | Cudak | E01C 11/245 404/19 |
| 9,234,960 | B1* | 1/2016 | McIntosh | E01F 9/529 |
| 9,677,232 | B2* | 6/2017 | Zwerneman | E01F 9/529 |
| 10,086,763 | B2* | 10/2018 | Parat | B60R 1/00 |
| 10,332,504 | B1* | 6/2019 | Bastyr | G10K 11/17835 |
| 2003/0025472 | A1* | 2/2003 | Jones | G05D 1/0227 318/568.12 |
| 2003/0201909 | A1* | 10/2003 | Hilliard | G08G 1/015 340/940 |
| 2004/0154171 | A1* | 8/2004 | Utz | B25D 5/02 30/367 |
| 2004/0208696 | A1* | 10/2004 | Watts | E01F 9/529 404/17 |
| 2005/0031412 | A1* | 2/2005 | Loader | E01C 19/238 404/75 |
| 2006/0137913 | A1* | 6/2006 | Dicko | G01L 1/14 177/1 |
| 2006/0224293 | A1* | 10/2006 | Kawazoe | B60T 7/22 701/1 |
| 2007/0031084 | A1* | 2/2007 | Wang | G01B 11/18 385/37 |
| 2007/0185664 | A1* | 8/2007 | Tanaka | G01M 13/028 702/56 |
| 2008/0240856 | A1* | 10/2008 | Griffiths | E01F 9/529 404/15 |
| 2009/0105921 | A1* | 4/2009 | Hanatsuka | B60G 17/0165 701/80 |
| 2010/0003078 | A1* | 1/2010 | Huang | E01F 13/123 404/6 |
| 2010/0272510 | A1* | 10/2010 | Mohajer | E01F 9/559 362/249.02 |
| 2011/0285518 | A1* | 11/2011 | Gordon | B60W 40/06 73/146 |
| 2012/0033076 | A1* | 2/2012 | Nakamura | B60W 10/18 348/148 |
| 2012/0051835 | A1* | 3/2012 | Taylor | F16B 21/165 403/322.2 |
| 2012/0098657 | A1* | 4/2012 | Bogatine | G08G 1/164 340/439 |
| 2014/0129027 | A1* | 5/2014 | Schnittman | G05D 1/0227 700/253 |
| 2014/0227031 | A1* | 8/2014 | Fifi | E01F 9/529 404/15 |
| 2014/0303844 | A1* | 10/2014 | Hoffmann | B60G 17/08 701/37 |
| 2015/0252540 | A1* | 9/2015 | Lee | E01F 9/529 404/6 |
| 2015/0298560 | A1* | 10/2015 | Keeling | B60L 5/005 191/10 |
| 2016/0034771 | A1* | 2/2016 | Schamp | B60G 17/019 348/148 |
| 2016/0078760 | A1* | 3/2016 | Crickmore | G08G 1/0116 701/117 |
| 2016/0132705 | A1* | 5/2016 | Kovarik | G06K 7/10376 340/10.3 |
| 2017/0096064 | A1* | 4/2017 | Anter | G06F 8/71 |
| 2017/0282921 | A1* | 10/2017 | Limbacher | B60W 50/0097 |
| 2018/0061238 | A1* | 3/2018 | Lei | G08G 1/162 |
| 2018/0156757 | A1* | 6/2018 | Nagrodsky | G01M 11/30 |
| 2018/0178781 | A1* | 6/2018 | Funk | H04L 67/12 |
| 2019/0023273 | A1* | 1/2019 | Ishioka | G08G 1/16 |
| 2019/0049994 | A1* | 2/2019 | Pohl | G05D 1/0278 |
| 2019/0194886 | A1* | 6/2019 | Yamamoto | G05D 1/02 |
| 2019/0194888 | A1* | 6/2019 | Blum | E01F 13/123 |
| 2019/0250618 | A1* | 8/2019 | Batts | G05D 1/0227 |
| 2019/0344634 | A1* | 11/2019 | Kim | B60G 17/0165 |
| 2020/0031356 | A1* | 1/2020 | Ozog | G05D 1/0227 |
| 2020/0156618 | A1* | 5/2020 | Kook | B60W 10/11 |
| 2020/0207356 | A1* | 7/2020 | Chandra | G05D 1/0248 |
| 2021/0046930 | A1* | 2/2021 | Wang | B60W 40/13 |
| 2021/0074091 | A1* | 3/2021 | Wang | B60W 50/00 |
| 2021/0197829 | A1* | 7/2021 | Garnault | G06K 9/00805 |
| 2021/0331677 | A1* | 10/2021 | Kim | G06N 3/08 |
| 2022/0026262 | A1* | 1/2022 | Hailesilassie | G01S 19/01 |

OTHER PUBLICATIONS

J. Tsurushiro and T. Nagaosa, "Vehicle localization using its vibration caused by road surface roughness," 2015 IEEE International Conference on Vehicular Electronics and Safety (ICVES), 2015, pp. 146-151, doi: 10.1109/ICVES.2015.7396909. (Year: 2015).*

X. Liu and M. Dohler, "Vibrotactile Alphabets: Time and Frequency Patterns to Encode Information," in IEEE Transactions on Haptics, vol. 14, No. 1, pp. 161-173, Jan. 1-Mar. 2021, doi: 10.1109/TOH. 2020.3005093. (Year: 2021).*

European Extended Search Report dated Apr. 29, 2021 for European Patent Application No. 20213181.9.

* cited by examiner

DRIVING SURFACE PROTRUSION PATTERN DETECTION FOR AUTONOMOUS VEHICLES

TECHNICAL FIELD

Aspects described herein generally relate to autonomous vehicles (AV) and, more particularly, to techniques implementing vehicle sensor input data to identify a pattern of protrusions embedded in a driving surface of autonomous vehicles.

BACKGROUND

A location system of an AV needs to be reliable and precise. Although Global Positioning Systems (GPS) can be used to sense AV location, GPS not only has a precision error of around five meters, environmental factors can have a negative impact. Accuracy may be improved by combining GPS with other sensing techniques, such as Assisted GPS (AGPS) or Assisted GPS (AGPS). AGPS mostly improves Time-To-First-Fix (TTFF) rather than location accuracy. And while Multi-Frequency GPS improves location precision, its relatively higher cost has prevented its widespread adoption. AV location accuracy remains a critical problem to be addressed.

BRIEF DESCRIPTION OF THE DRAWINGS

In the figures, like reference characters generally refer to the same parts throughout the different views. The drawings are not necessarily to scale, emphasis instead generally being placed upon illustrating the principles of the disclosure. In the following description, various aspects of the disclosure are described with reference to the following figures in which.

DESCRIPTION OF THE ASPECTS

The present disclosure is directed to detecting vehicle location based on mechanical feedback resulting from a vehicle driving over protrusions embedded in a driving surface. Also, vehicle location accuracy may be improved upon by supplementing location information of an existing location system with the vehicle location information described herein.

Various aspects are described throughout the disclosure with reference to autonomous vehicles by way of example and not limitation. For instance, although the aspects described herein may advantageously be used as part of an autonomous vehicle architecture, the aspects may be implemented as part of any suitable type of fully autonomous vehicle, semi-autonomous vehicle, or non-autonomous vehicle.

Figure 1:
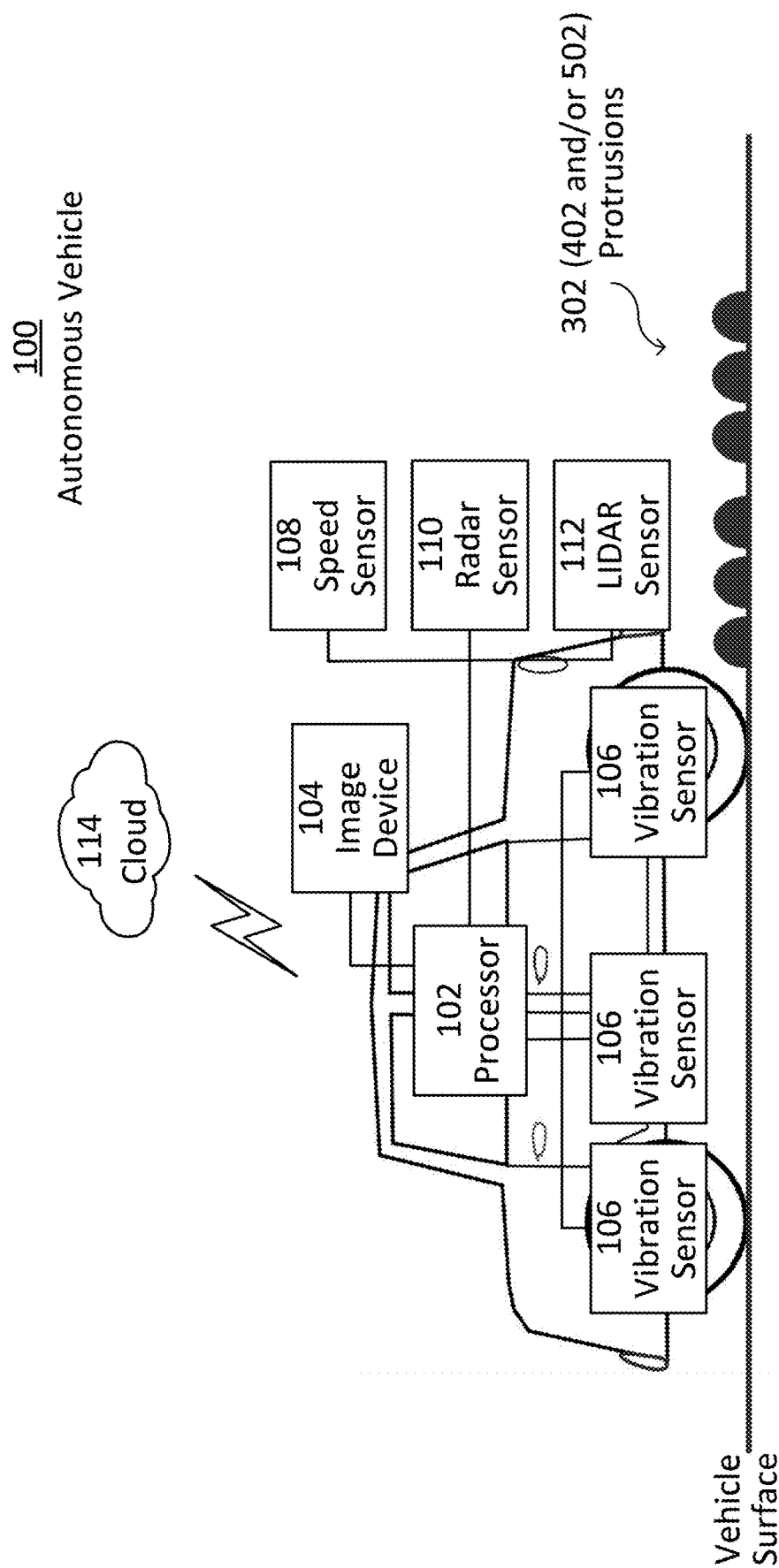
FIG. 1 illustrates an exemplary autonomous vehicle in accordance with various aspects of the present disclosure.
Figure 2:
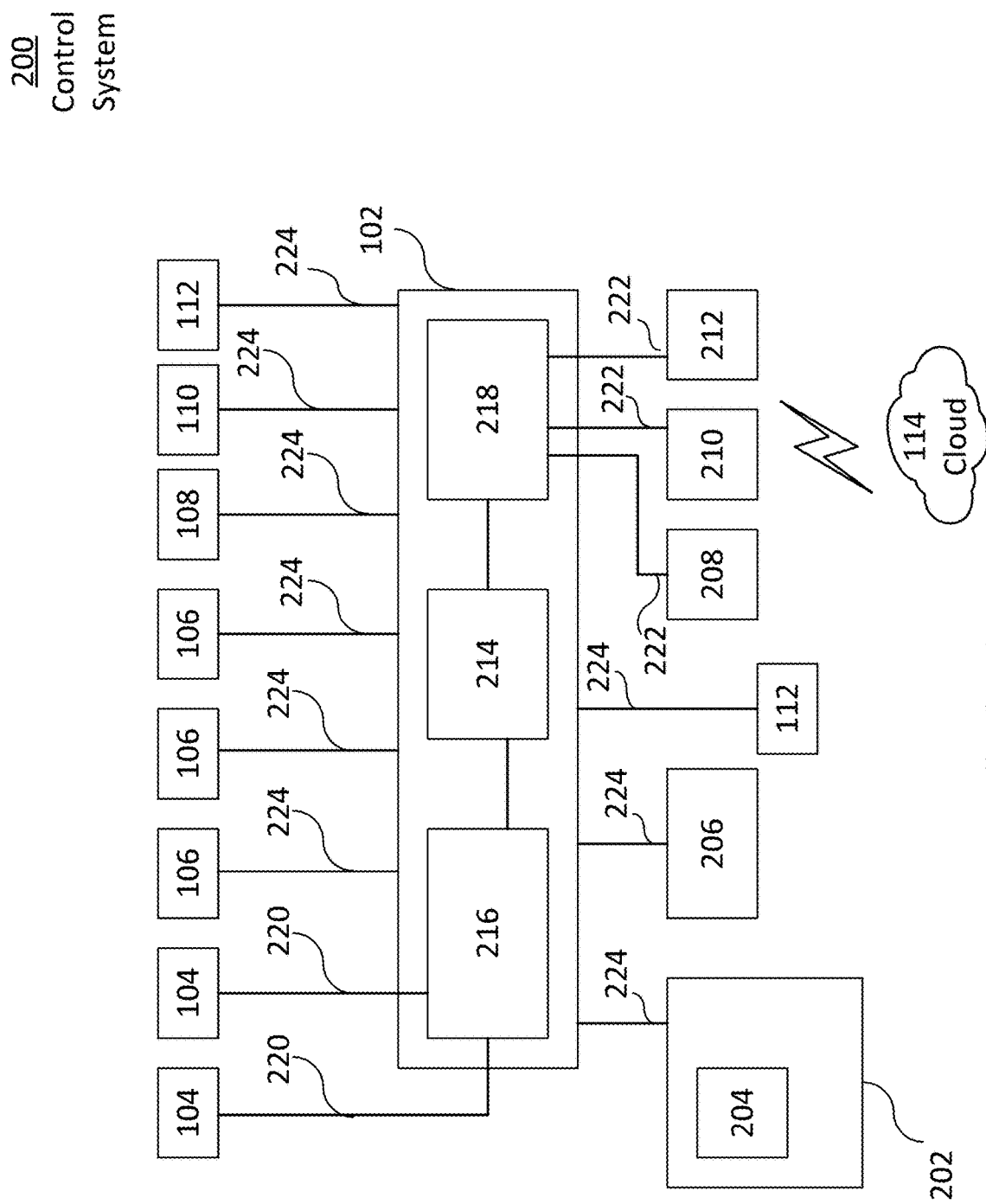
FIG. 2 illustrates various exemplary electronic components of a control system of the autonomous vehicle of FIG. 1 in accordance with various aspects of the present disclosure.

FIG. 1 illustrates an exemplary autonomous vehicle (AV) 100, and FIG. 2 illustrates various exemplary electronic components of a control system of the AV of FIG. 1 in accordance with various aspects of the present disclosure. The vehicle 100 is shown on a vehicle surface having protrusions 302 (402 and/or 502) embedded therein, as will be described further below.

The vehicle 100 and the control system 200 are exemplary in nature, and may thus be simplified for explanatory purposes. Locations of elements and relational distances (as discussed above, the figures are not to scale) and are provided by way of example and not limitation. The control system 200 may include various components depending on the requirements of a particular implementation.

The control system 200 may include one or more processors 102, one or more image acquisition devices 104 such as, e.g., one or more cameras, one or more position sensors such as a Global Navigation Satellite System (GNSS), e.g., a Global Positioning System (GPS) (not shown), one or more vibration sensors 106, one or more memories 202, one or more map databases 204, one or more user interfaces 206 (such as, e.g., a display, a touch screen, a microphone, a loudspeaker, one or more buttons and/or switches, and the like), one or more wireless transceivers 208, 210, 212, and part of the cloud 114.

The wireless transceivers 208, 210, 212 may be configured according to different desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards. As a further example, a wireless transceiver (e.g., a third wireless transceiver 212) may be configured in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more wireless transceivers 208, 210, 212 may be configured to transmit signals via an antenna system (not shown) via an air interface.

The one or more processors 102 may be located in the vehicle's Electronic Control Unit (ECU) and/or any other suitable location of the vehicle 100. Alternatively or additionally, the one or more processors 102 may be located in the cloud 114. The location of the one or more processors 102 is not limited.

The one or more processors 102 may include an application processor 214, an image processor 216, a communication processor 218, or any other suitable processing device. Similarly, image acquisition devices 104 may include any number of image acquisition devices and components depending on the requirements of a particular application. Image acquisition devices 104 may include one or more image capture devices (e.g., cameras, charge coupling devices (CCDs), or any other type of image sensor). The control system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218.

The memories 202 as well as the one or more user interfaces 206 may be coupled to each of the one or more processors 102, e.g., via a third data interface. The third data interface may include any wired and/or wireless third link 224 or third links 224. Furthermore, the vibration sensor 106 may be coupled to each of the one or more processors 102, e.g., via the third data interface. The vibration sensors 106 may be located in any suitable location within the vehicle 100.

Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for data processing (e.g. image, audio, etc.) and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the control system. A memory of the one or more memories 202 may store one or more databases and image processing software, as well as a trained system, such as a neural network, a deep neural network, and/or a convolutional deep neural network (CNN), for example, as further discussed herein. The one or more memories 202 may include any number of random access memories, read only memories, flash memories, disk drives, optical storage, tape storage, removable storage, and other types of storage.

In some aspects, the control system 200 may further include components such as a speed sensor 108 (e.g., a speedometer) for measuring a speed of the vehicle 100. The control system may also include one or more accelerometers (either single axis or multi axis) (not shown) for measuring accelerations of the vehicle 100 along one or more axes. The control system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location and/or orientation of the vehicle 100 relative to the known landmarks and refine the determination of the vehicle's location. Certain aspects of this technology may be included in a localization technology such as a mapping and routing model.

The map database 204 may include any suitable type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Figure 3:
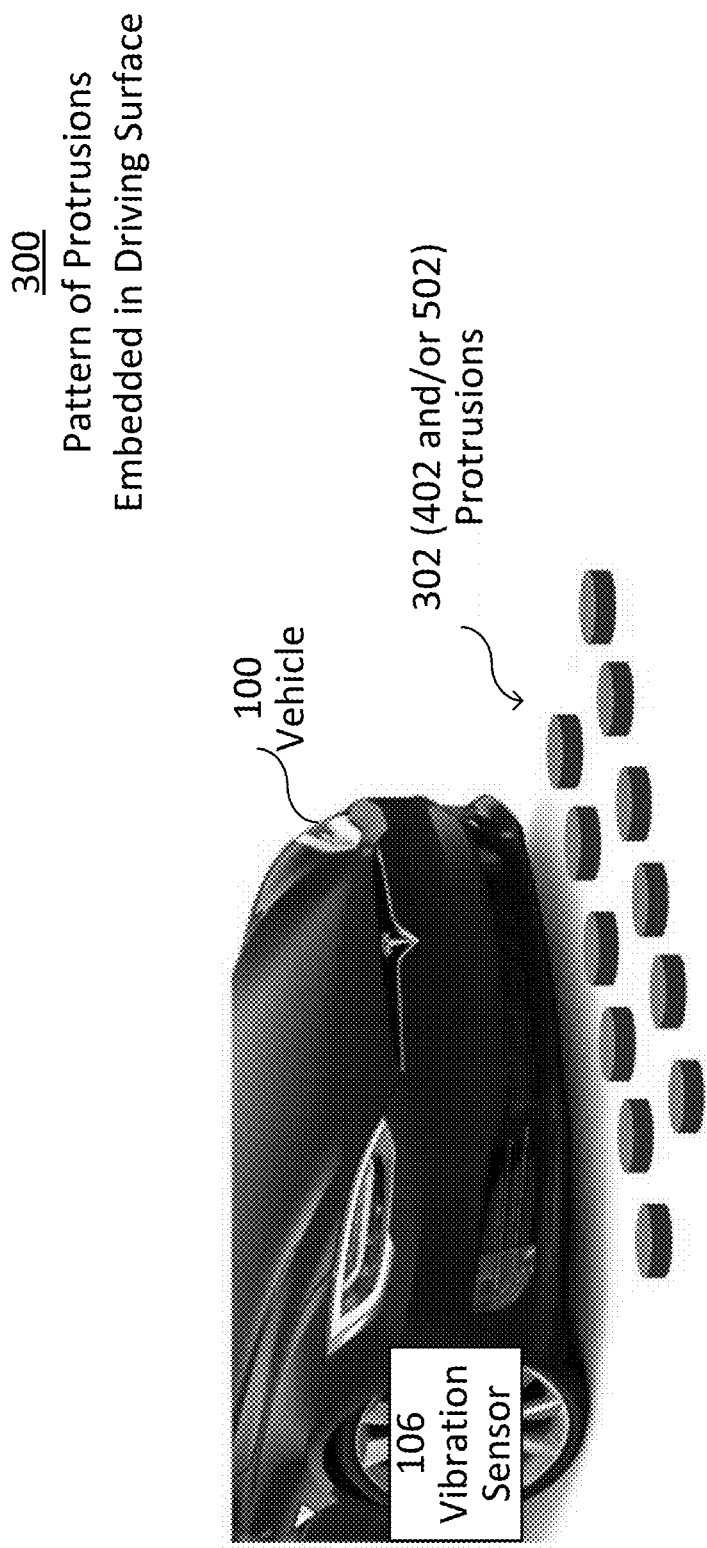
FIG. 3 illustrates an exemplary pattern of protrusions embedded in a driving surface in accordance with various aspects of the present disclosure.

FIG. 3 illustrates an exemplary pattern of protrusions 302 embedded in a driving surface in accordance with various aspects of the present disclosure. More detailed examples of the protrusions 302 are described below with respect to FIGS. 4 and 5.

The protrusions 302 are shown as disc-shaped. This shape is not meant to be limiting. Alternatively, one or more of the protrusions 302 may have a shape that is elongated, domelike, or any other shape(s) as suitable. Also, the height(s) of the protrusions 302 is not limited.

The protrusions 302 are arranged in a pattern to provide information. This information may be location information that assists vehicle location efforts. The location information may be geographic, a name, a floor number, etc. The information may additionally or alternatively include other information, which may be any type of information as desired.

By way of overview, when the vehicle 100 drives over the pattern of protrusions 302, one or more of the vehicle's vibration sensors 106 sense vibrations caused by pressure between the protrusions 302 and any of the vehicle tires. The one or more vibration sensors 106 output a signal having data encoded thereon representing the pattern information. The one or more processors 102 are configured to receive the signal from the vibration sensors 106 and decode the data to identify the pattern of protrusions 302 representing the information.

Figure 4:
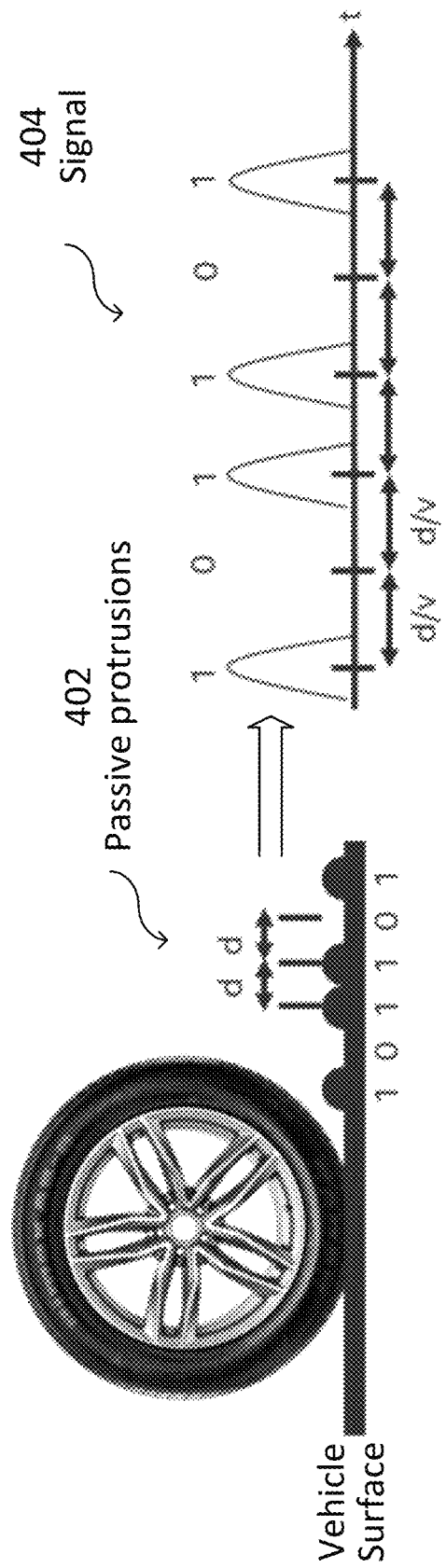
FIG. 4 illustrates an exemplary encoding technique to generate a data signal from a pattern of protrusions in accordance with various aspects of the present disclosure.

FIG. 4 illustrates an exemplary encoding technique to generate a data signal from a pattern of protrusions in accordance with various aspects of the present disclosure.

The protrusions 402 in this example are passive and form a passive array. When a vehicle tire runs over a passive protrusion 402, the passive protrusion 402 remains in a fixed vertical position.

As discussed above with respect to FIG. 3, the vibration sensors 106 output a vibration signal, in this case represented by reference numeral 404. The signal 404 comprises peaks and nulls corresponding with the protrusions 402 and lack thereof, respectively, each separated by a distance d. The peaks and nulls are separated in time (t=d/v) depending on a speed or velocity v of the vehicle 100, and distance d therebetween. The signal shapes are simplified for illustration, but may be more complex in actual implementation.

The processor 102 is configured to decode data encoded in the signal 404 that identifies a pattern of protrusions 402 embedded in a driving surface. The signals 404 are received by the processor 102 from at least one vehicle vibration sensor 106. The one or more processors 102 decodes the signals 404 into a series of bits. In this example a peak is decoded into a logical "1" and a null into a logical "0", though the disclosure is not limited in this respect. In this example shown in the figure, the signal 404 is decoded into 101101. The one or more processors 102 factor in a speed and/or direction of the vehicle 100 based on a speed signal received from the speed sensor 108.

It is possible the vehicle 100 will traverse the protrusions 402 at an angle, resulting in a series of vibrations delayed and a slightly different distance between the signal peaks and nulls. The one or more processors 102 may be configured to compensate for this variation, possibly based on a direction the vehicle is traveling. The direction information may be known from GPS.

The processor 102 may decode data encoded in a plurality of signals received from a plurality of vehicle vibration sensors 106. Also, the sensed vibrations may be complex due to echoing. For example, a sensor 106 located in a cabin of the vehicle 100 may sense an initial vibration, and then reflections within the cabin may result in the vibration sensor 106 sensing a similar signal but delayed in time. And then when the rear tires subsequently traverse the same protrusions 402 as a front tire, the vibration sensors 106 will sense a different set of vibrations. The one or more processors 102 are configured to process these multiple signals into actual data.

The pattern of protrusions 402 may be designed to cause error detection data to be encoded in the signal 404. The error detection may be Forward Error Correction (FEC), or alternatively, any detection and/or correction method as is suitable. Additionally or alternatively, the pattern of protrusions 302 may be designed to cause redundant data to be encoded in the signal 404. A redundant pattern of protrusions 402 may be positioned to be driven over by a same vehicle tire, or alternatively, different vehicle tires. The processor 102 may be configured to perform error detection, and possibly also correction, of the data. Data may then still be accurately recognized even when the environment is noisy or the protrusions 402 have been damaged.

The processor 102 may provide the decoded data to another system to supplement data of the other system. The other system may be one or more of a Global Positioning System (GPS), a camera system, a radar system, and a Light Detection and Ranging (LIDAR) system. If the data encoded in the signal 404 is location data, the processor 102 may provide the location data to another location system to improve location detection accuracy.

Figure 5:
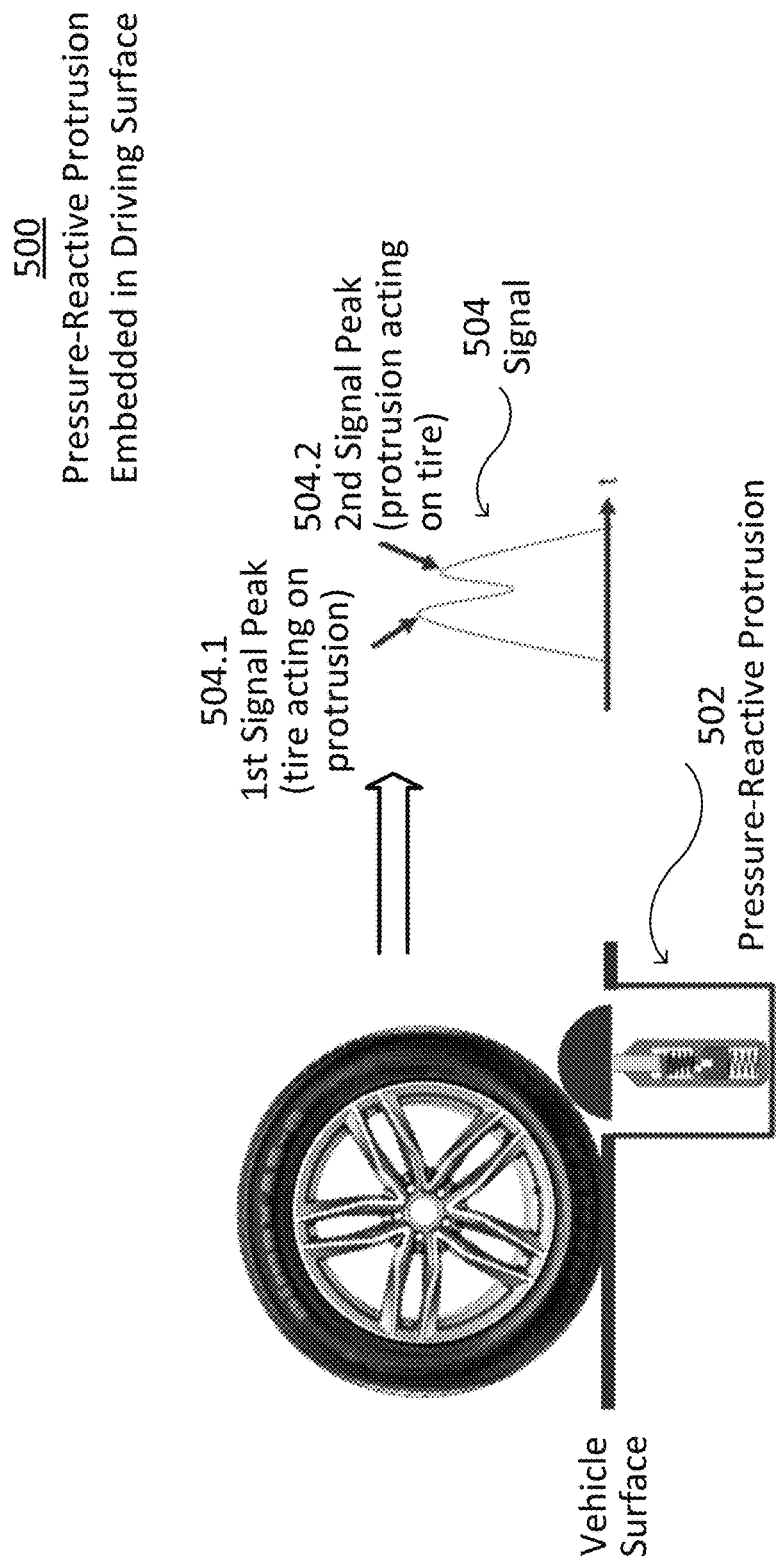
FIG. 5 illustrates an exemplary pressure-reactive protrusion embedded in a driving surface in accordance with various aspects of the present disclosure.

FIG. 5 illustrates an exemplary pressure-reactive protrusion 502 embedded in a driving surface in accordance with various aspects of the present disclosure.

The pressure-reactive protrusion 502 may replace one or more of the passive protrusions 402 of FIG. 4 to form an active array. Rather than being in a fixed vertical position, the pressure-reactive protrusion 502 is configured to react to vehicle pressure. The pressure-reactive protrusion 502 may be similar to an automatic center punch used to break vehicle windows in emergency situations. A spring mechanism stores energy when a vehicle tire presses the protrusion 502. Past a certain threshold, the spring is released as an impulse that drives a piston into the vehicle tire. The disclosure is not limited to this particular mechanical design.

The resulting vibration signal 504 has, from a single press of one of the pressure-reactive protrusion 502, a first signal peak 504.1 that identifies the vehicle pressure on the pressure-reactive protrusion 502, and a second signal peak 504.2 that identifies the corresponding reaction of the pressure-reactive protrusion 502. Of course the signal could be more complex in actual implementation. The one or more processors 102 are configured to decode the data encoded in the vibration signal into corresponding multiple bits identifying the vehicle pressure on the pressure-reactive protrusion and the corresponding reaction. The pressure-reactive protrusion 502 is safer and more robust against hacking than the passive protrusion 402 due to a multi-bit signature that is more difficult to replace or reproduce.

Driving surface protrusion pattern detection as disclosed here results in improved vehicle location accuracy to within the centimeter range, even during a power shortage. Error correction and/or redundancy of the vibration pattern allows for decoding even when there is damage to protrusion array, such as partial removal of the embedded protrusions. Further, pressure-reactive protrusions 502 advantageously prevent malicious attacks.

EXAMPLES

The following examples pertain to further aspects.

Example 1. A component of an Autonomous Vehicle (AV) system, the component comprising: at least one processor; and a non-transitory computer-readable storage medium including instructions that, when executed by the at least one processor, cause the at least one processor to decode data encoded in a signal, wherein the data identifies a pattern of protrusions embedded in a driving surface, the signal being received from at least one vehicle sensor resulting from a vehicle driving over the pattern of protrusions in the driving surface.

Example 2. The component of example 1, wherein the pattern of protrusions comprises a passive array having fixed protrusions.

Example 3. The component of example 1, wherein the pattern of protrusions comprises an active array having pressure-reactive protrusions.

Example 4. The component of example 3, wherein the pressure-reactive protrusions are configured to react to vehicle pressure such that the pressure signal has, from a single press of one of the pressure-reactive protrusions, a first signal peak that identifies the vehicle pressure on the pressure-reactive protrusion, and a second signal peak that identifies the corresponding reaction, and the instructions further cause the at least one processor to decode the data encoded in the vibration signal, wherein the data identifies the vehicle pressure on the pressure-reactive protrusion and the corresponding reaction.

Example 5. The component of example 1, wherein the instructions further cause the at least one processor to determine physical separations of the protrusions based on a speed of the vehicle.

Example 6. The component of example 1, wherein the pattern of protrusions cause error detection data to be encoded in the signal, and the instructions further cause the at least one processor to perform error detection of the decoded data.

Example 7. The component of example 1, wherein the pattern of protrusions cause error detection data to be encoded in the signal, and the instructions further cause the at least one processor to perform Forward Error Correction (FEC) of the decoded data.

Example 8. The component of example 1, wherein the pattern of protrusions causes redundant data to be encoded in the signal, and the instructions further cause the at least one processor to use the redundant data to perform error detection of the decoded data.

Example 9. The component of example 1, wherein the data encoded in the signal is location data.

Example 10. The component of example 1, wherein the instructions further cause the at least one processor to provide the decoded data to another system to supplement data of the other system with the decoded data.

Example 11. The component of example 10, wherein the system is one or more of a Global Positioning System (GPS), a camera system, a radar system, and a Light Detection and Ranging (LIDAR) system.

Example 12. The component of example 1, wherein the data encoded in the signal is location data, and the instructions further cause the at least one processor to provide the location data to a location system to supplement location data used by the location system with the decoded location data.

Example 13. The component of example 1, wherein the signal comprises signal peaks and nulls corresponding with protrusions and lack thereof, separated in time depending on a speed or direction of the vehicle, and the instructions further cause the at least one processor to decode the data encoded in the signal factoring in the speed or direction of the vehicle based on a speed signal received from a speed sensor.

Example 14. The component of example 1, wherein the instructions further cause the at least one processor to decode data encoded in a plurality of signals received from a plurality of vehicle sensors.

Example 15. The component of example 1, wherein the component is located in an Electronic Control Unit (ECU) of the AV.

Example 16. The component of example 1, wherein the component is located in the cloud.

Example 17. An Autonomous Vehicle (AV), comprising: at least one vehicle sensor; and a component comprising: at least one processor; and a non-transitory computer-readable storage medium including instructions that, when executed by the at least one processor, cause the at least one processor to decode data encoded in a signal, wherein the data identifies a pattern of protrusions embedded in a driving surface, the signal being received from the at least one vehicle sensor resulting from the AV driving over the pattern of protrusions in the driving surface.

Example 18. The AV of example 17, wherein the pattern of protrusions comprises a passive array having fixed protrusions.

Example 19. The AV of example 17, wherein the pattern of protrusions comprises an active array having pressure-reactive protrusions.

Example 20. The AV of example 17, wherein the data encoded in the signal is location data, and the instructions further cause the at least one processor to provide the location data to a location system to supplement location data used by the location system with the decoded location data.

Example 21. A non-transitory computer-readable storage medium including instructions that, when executed by at least one processor of a component of an Autonomous Vehicle (AV) system, cause the at least one processor to decode data encoded in a signal, wherein the data identifies a pattern of protrusions embedded in a driving surface, the signal being received from at least one vehicle sensor resulting from a vehicle driving over the pattern of protrusions in the driving surface.

Example 22. The non-transitory computer-readable storage medium of example 21, wherein the pattern of protrusions cause error detection data to be encoded in the signal, and the instructions further cause the at least one processor to perform error detection of the decoded data.

Example 23. The non-transitory computer-readable storage medium of example 21, wherein the pattern of protrusions cause error detection data to be encoded in the signal, and the instructions further cause the at least one processor to perform Forward Error Correction (FEC) of the decoded data.

Example 24. The non-transitory computer-readable storage medium of example 21, wherein the pattern of protrusions causes redundant data to be encoded in the signal, and the instructions further cause the at least one processor to use the redundant data to perform error detection of the decoded data.

Example 25. The component of example 24, wherein the instructions further cause the at least one processor to determine physical separations of the protrusions based on a speed of the vehicle.

Example 26 is an apparatus as shown and described.

Example 27 is a method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, and the like.

A "ground vehicle" may be understood to include any type of vehicle, as described above, which is driven on the ground, e.g., on a street, on a road, on a track, on one or more rails, off-road, etc.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A component of an Autonomous Vehicle (AV) system, the component comprising:
   at least one processor; and
   a non-transitory computer-readable storage medium including instructions that, when executed by the at least one processor, cause the at least one processor:
   to decode data encoded in a signal, wherein the data identifies a pattern of protrusions embedded in a driving surface, the signal being received from at least one vehicle sensor resulting from a vehicle driving over the pattern of protrusions in the driving surface, and to transmit the decoded data to another system to supplement data of the other system with the decoded data for controlling the AV,
   wherein the pattern of protrusions comprises an active array having pressure-reactive protrusions, and the pressure-reactive protrusions are configured to react to vehicle pressure such that the signal, which is a pressure signal, has, from a single press of one of the pressure-reactive protrusions, a first signal peak that identifies the vehicle pressure on the respective pressure-reactive protrusion, and a second signal peak that identifies a corresponding reaction by the respective pressure-reactive protrusion, wherein the first and second peaks are both positive peaks or both negative peaks, and the instructions further cause the at least one processor to decode the data encoded in the pressure signal, wherein the data identifies the vehicle pressure on the pressure-reactive protrusions and the corresponding reactions.

2. The component of claim 1, wherein the pattern of protrusions additionally comprises a passive array having fixed protrusions.

3. The component of claim 1, wherein the instructions further cause the at least one processor to determine physical separations of the protrusions based on a speed of the vehicle.

4. The component of claim 1, wherein the pattern of protrusions cause error detection data to be encoded in the signal, and the instructions further cause the at least one processor to perform error detection of the decoded data.

5. The component of claim 1, wherein the pattern of protrusions cause error detection data to be encoded in the signal, and the instructions further cause the at least one processor to perform Forward Error Correction (FEC) of the decoded data.

6. The component of claim 1, wherein the pattern of protrusions causes redundant data to be encoded in the signal, and the instructions further cause the at least one processor to use the redundant data to perform error detection of the decoded data.

7. The component of claim 1, wherein the data encoded in the signal is location data.

8. The component of claim 1, wherein the another system is one or more of a Global Positioning System (GPS), a camera system, a radar system, and a Light Detection and Ranging (LIDAR) system.

9. The component of claim 1, wherein the data encoded in the signal is location data, and the instructions further cause the at least one processor to provide the location data to a location system to supplement location data used by the location system with the decoded location data.

10. The component of claim 1, wherein the signal comprises signal peaks and nulls corresponding with protrusions and lack thereof, separated in time depending on a speed or direction of the vehicle, and the instructions further cause the at least one processor to decode the data encoded in the signal factoring in the speed or direction of the vehicle based on a speed signal received from a speed sensor.

11. The component of claim 1, wherein the instructions further cause the at least one processor to decode data encoded in a plurality of signals received from the at least one vehicle sensor.

12. The component of claim 1, wherein the component is located in an Electronic Control Unit (ECU) of the AV.

13. The component of claim 1, wherein the component is located in the cloud.

14. An Autonomous Vehicle (AV), comprising:
at least one vehicle sensor; and
a component comprising:
at least one processor; and
a non-transitory computer-readable storage medium including instructions that, when executed by the at least one processor, cause the at least one processor:
to decode data encoded in a signal, wherein the data identifies a pattern of protrusions embedded in a driving surface, the signal being received from the at least one vehicle sensor resulting from the AV driving over the pattern of protrusions in the driving surface, wherein the data encoded in the signal is location data, and to pry transmit the location data to a location system to supplement location data used by the location system with the decoded location data for controlling the AV,
wherein the pattern of protrusions comprises an active array having pressure-reactive protrusions, and the pressure-reactive protrusions are configured to react to vehicle pressure such that the signal, which is a pressure signal, has, from a single press of one of the pressure-reactive protrusions, a first signal peak that identifies the vehicle pressure on the respective pressure-reactive protrusion, and a second signal peak that identifies a corresponding reaction by the respective pressure-reactive protrusion, wherein the first and second peaks are both positive peaks or both negative peaks, and the instructions further cause the at least one processor to decode the data encoded in the pressure signal, wherein the data identifies the vehicle pressure on the pressure-reactive protrusions and the corresponding reactions.

15. The AV of claim 14, wherein the pattern of protrusions comprises a passive array having fixed protrusions.

16. A non-transitory computer-readable storage medium including instructions that, when executed by at least one processor of a component of an Autonomous Vehicle (AV) system, cause the at least one processor to decode data encoded in a signal, wherein the data identifies a pattern of protrusions embedded in a driving surface, the signal being received from at least one vehicle sensor resulting from a vehicle driving over the pattern of protrusions in the driving surface, and to transmit the decoded data to another system to supplement data of the other system with the decoded data for controlling the AV, wherein the pattern of protrusions comprises an active array having pressure-reactive protrusions, and the pressure-reactive protrusions are configured to react to vehicle pressure such that the signal, which is a pressure signal, has, from a single press of one of the pressure-reactive protrusions, a first signal peak that identifies the vehicle pressure on the respective pressure-reactive protrusion, and a second signal peak that identifies a corresponding reaction by the respective pressure-reactive protrusion, wherein the first and second peaks are both positive peaks or both negative peaks, and the instructions further cause the at least one processor to decode the data encoded in the pressure signal, wherein the data identifies the vehicle pressure on the pressure-reactive protrusions and the corresponding reactions.

17. The non-transitory computer-readable storage medium of claim 16, wherein the pattern of protrusions cause error detection data to be encoded in the signal, and the instructions further cause the at least one processor to perform error detection of the decoded data.

18. The non-transitory computer-readable storage medium of claim 16, wherein the pattern of protrusions cause error detection data to be encoded in the signal, and the instructions further cause the at least one processor to perform Forward Error Correction (FEC) of the decoded data.

19. The non-transitory computer-readable storage medium of claim 16, wherein the pattern of protrusions causes redundant data to be encoded in the signal, and the instructions further cause the at least one processor to use the redundant data to perform error detection of the decoded data.

20. The component of claim 19, wherein the instructions further cause the at least one processor to determine physical separations of the protrusions based on a speed of the vehicle.

* * * * *